(12) United States Patent
Maruyama et al.

(10) Patent No.: US 11,780,489 B2
(45) Date of Patent: Oct. 10, 2023

(54) TURNING ANGLE DETECTING DEVICE AND ELECTRIC POWER STEERING DEVICE

(71) Applicant: NSK LTD., Tokyo (JP)

(72) Inventors: Shoya Maruyama, Maebashi (JP); Tetsuya Kitazume, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/909,154

(22) PCT Filed: Feb. 4, 2022

(86) PCT No.: PCT/JP2022/004505
§ 371 (c)(1),
(2) Date: Sep. 2, 2022

(87) PCT Pub. No.: WO2022/224543
PCT Pub. Date: Oct. 27, 2022

(65) Prior Publication Data
US 2023/0192178 A1  Jun. 22, 2023

(30) Foreign Application Priority Data

Apr. 21, 2021 (JP) ................................. 2021-071912

(51) Int. Cl.
*B62D 5/04* (2006.01)
*B62D 6/00* (2006.01)
*B62D 15/02* (2006.01)

(52) U.S. Cl.
CPC ........... *B62D 5/0409* (2013.01); *B62D 6/002* (2013.01); *B62D 15/0235* (2013.01); *B62D 15/0245* (2013.01)

(58) Field of Classification Search
CPC .. B62D 5/0409; B62D 6/002; B62D 15/0235; B62D 15/0245
See application file for complete search history.

(56) References Cited

U.S. PATENT DOCUMENTS 5,200,747 A    4/1993  Betz et al.
5,343,393 A *  8/1994  Hirano ............... B62D 15/0245
                                                        180/413

(Continued)

FOREIGN PATENT DOCUMENTS

JP     2008-285043 A    11/2008
JP        4323402 B2     9/2009
(Continued)

OTHER PUBLICATIONS

International Search Report for PCT/JP2022/004505, dated Apr. 26, 2022.
Written Opinion for PCT/JP2022/004505, dated Apr. 26, 2022.

*Primary Examiner* — Tony H Winner
(74) *Attorney, Agent, or Firm* — Sughrue Mion, PLLC

(57) ABSTRACT

A turning angle detecting device includes: a first storage unit configured to store a turning angle neutral point correction value being a difference between a median of the turning angles at respective limits in right and left steering and the turning angle in a straight traveling state; a second storage unit configured to store an initial position of a movable portion of an actuator of a wheel turning mechanism in the straight traveling state; a first turning angle calculating unit configured to calculate a first turning angle with respect to the median of the turning angles at the respective limits based on a detection value of a position of the movable portion; and a second turning angle calculating unit configured to calculate a second turning angle based on the detection value, the turning angle neutral point correction value, the initial position and the first turning angle.

8 Claims, 5 Drawing Sheets

(56) References Cited

U.S. PATENT DOCUMENTS

| | | | |
|---|---|---|---|
| 2017/0291640 A1 | 10/2017 | Fujita et al. | |
| 2017/0334480 A1* | 11/2017 | Yamazaki | B62D 15/0215 |
| 2018/0362073 A1* | 12/2018 | Hirate | B62D 15/0285 |
| 2019/0161112 A1* | 5/2019 | Ito | B62D 6/00 |
| 2020/0361524 A1 | 11/2020 | Zouza et al. | |
| 2021/0094608 A1* | 4/2021 | Toko | B62D 5/0409 |

FOREIGN PATENT DOCUMENTS

| | | |
|---|---|---|
| JP | 2014-019264 A | 2/2014 |
| JP | 2017-191092 A | 10/2017 |
| JP | 2019-131015 A | 8/2019 |
| JP | 2020-188607 A | 11/2020 |

* cited by examiner

When $\theta nm - \theta m2 \geq -180$ AND $\theta nm - \theta m2 \leq 180$,
$\Delta\theta m = \theta nm - \theta m2$ When $\theta nm - \theta m2 < -180$,
$\Delta\theta m = (\theta nm - \theta m2) + 360$ When $\theta nm - \theta m2 > 180$,
$\Delta\theta m = (\theta nm - \theta m2) - 360$

TURNING ANGLE DETECTING DEVICE AND ELECTRIC POWER STEERING DEVICE

CROSS REFERENCE TO RELATED APPLICATIONS

This application is a National Stage of International Application No. PCT/JP2022/004505 filed Feb. 4, 2022, claiming priority based on Japanese Patent Application No. 2021-071912 filed Apr. 21, 2021.

TECHNICAL FIELD

The present invention relates to a turning angle detecting device and an electric power steering device.

BACKGROUND ART

PTL 1 below describes a technology that detects turning angles at respective limits when a steering wheel is steered right and left, respectively, sets a median thereof as a turning angle neutral point, and obtains a turning angle with respect to the neutral point.

In the following description, turning angles at limits in right and left steering may be described as "rack end turning angles". For example, when assuming that a turning angle value on a right side from a neutral position is positive and a turning angle value on a left side therefrom is negative, the rack end turning angle in right steering is a maximum turning angle when the steering wheel is steered to a rightward limit, and the rack end turning angle in left steering is a minimum turning angle when the steering wheel is steered to a leftward limit.

CITATION LIST

Patent Literature

PTL 1: JP Pat. No. 4323402 B2

SUMMARY OF INVENTION

Technical Problem

However, the median of the left and right rack end turning angles does not necessarily coincide with a turning angle when a vehicle is in a straight traveling state, and also an error occurs in detection of the rack end turning angles. Therefore, the technology described in PTL 1 cannot accurately calculate a turning angle with respect to the turning angle when the vehicle is traveling straight.

The present invention has been made in view of the problem described above. It is an object of the present invention to calculate, with high accuracy, a turning angle with respect to a turning angle when a vehicle is traveling straight.

Solution to Problem

In order to achieve the above-described object, according to an aspect of the present invention, there is provided a turning angle detecting device including: a position detecting unit configured to detect a turning angle of a wheel turning mechanism; an actuator configured to drive the wheel turning mechanism; a first storage unit configured to store a turning angle neutral point correction value being a difference between a median of the turning angles at respective limits in right steering and left steering and the turning angle when a vehicle is traveling straight; a second storage unit configured to store an actuator initial position being a position of a movable portion of the actuator when the vehicle is traveling straight; an actuator position detecting unit configured to detect the position of the movable portion of the actuator as a first actuator position; a first turning angle calculating unit configured to calculate, as a first turning angle, the turning angle of the wheel turning mechanism with respect to the median of the turning angles at the respective limits in the right steering and the left steering on a basis of the first actuator position; and a second turning angle calculating unit configured to calculate a second turning angle with respect to the turning angle of the wheel turning mechanism when the vehicle is traveling straight on a basis of the first actuator position, the turning angle neutral point correction value, the actuator initial position, and the first turning angle.

In order to achieve the above-described object, according to another aspect of the present invention, there is provided an electric power steering device including the turning angle detecting device described above, wherein the actuator is driven on a basis of the second turning angle to apply a turning assist force to the wheel turning mechanism.

Advantageous Effects of Invention

According to the present invention, a highly accurate calculation can be made for a turning angle with respect to a turning angle when a vehicle is traveling straight.

DESCRIPTION OF EMBODIMENTS

Embodiments of the present invention will be described in detail with reference to the drawings. Note that the embodiments of the present invention to be described below indicate devices and methods to embody the technical idea of the present invention by way of example, and the technical idea of the present invention does not limit the constitution, arrangements, and the like of the constituent components to those described below. The technical idea of the present invention can be subjected to a variety of alterations within the technical scope prescribed by the claims described in CLAIMS.

(Configuration)

Figure 1:
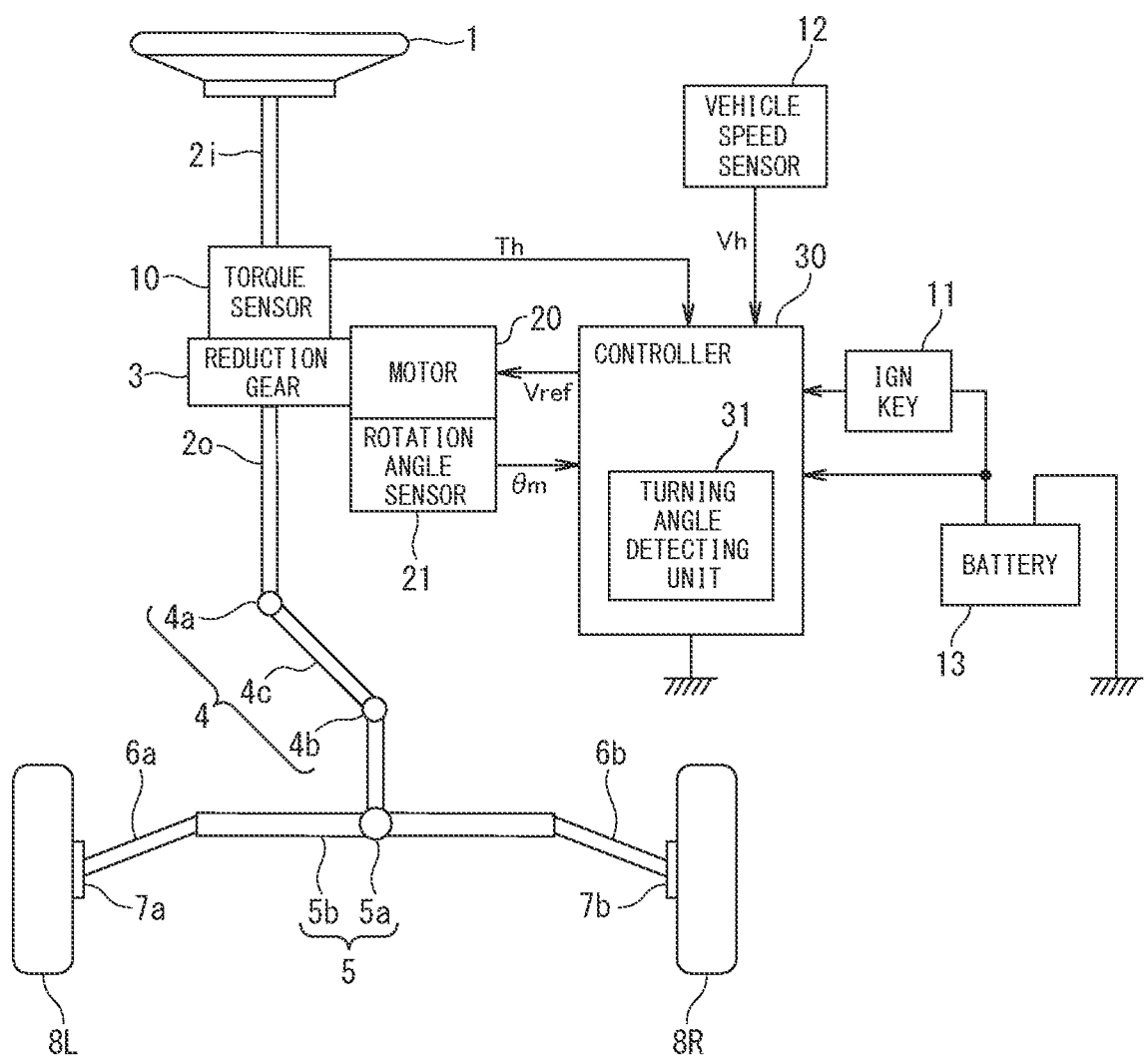
FIG. 1 is a configuration diagram illustrating an outline of an example of an electric power steering device of an embodiment.

FIG. 1 is a configuration diagram illustrating an outline of an example of an electric power steering device of an embodiment. Column shafts (steering shafts) $2i$ and $2o$ of a steering wheel (steering handle) 1 are connected to steered wheels 8L and 8R via a reduction gear (worm gear) 3 constituting a speed reduction mechanism, an intermediate shaft 4, a pinion rack mechanism 5, and tie rods 6a and 6b, and further via hub units 7a and 7b.

The column input shaft 2i and the column output shaft 2o are connected by a torsion bar (not illustrated) that twists due to a rotation angle deviation between the column input shaft 2i and the column output shaft 2o.

The intermediate shat 4 includes a shaft member 4c and universal joints 4a and 4b attached to both ends of the shaft member 4c. The universal joint 4a is connected to the column output shaft 2o, and the universal joint 4b is connected to the pinion rack mechanism 5.

The pinion rack mechanism 5 includes a pinion 5a connected to a pinion shaft to which steering force is transmitted from the universal joint 4b and a rack 5b engaging with the pinion 5a, and converts a rotational motion transmitted to the pinion 5a into a translational motion in a vehicle width direction by the rack 5b.

The steering shafts 2 (column shafts 2i and 2o) are provided with a torque sensor 10 that detects a steering torque Th.

Additionally, a motor 20 that assists a steering force of the steering wheel 1 is connected to the column output shaft 2o via the reduction gear 3. A rotation shaft of the motor 20 is provided with a rotation angle sensor 21 that detects a mechanical angle $\theta m$ of the rotation shaft. The mechanical angle $\theta m$ is an example of a "first actuator position" described in the claims.

The amount of rotation of the column output shaft 2o is obtained by dividing the amount of rotation of the rotation shaft of the motor 20 by a reduction ratio R of the reduction gear 3. A controller 30 calculates, as a turning angle $\theta t$, a rotation angle of the column output shaft 2o obtained by dividing the mechanical angle $\theta m$ by reduction ratio R of the reduction gear 3.

Note that the motor 20 is an example of an "actuator" described in the claims. The reduction ratio R of the reduction gear 3 is an example of a "conversion coefficient" described in the claims. In addition, the actuator in the present invention is not limited to a motor, and various kinds of actuators can be used.

Electrical power from a battery 13 is supplied to the controller 30, which controls an electric power steering (EPS) device, and also an ignition key signal is input to the controller 30 via an ignition (IGN) key 11.

The controller 30 calculates a current command value of an assist control command on the basis of the steering torque Th detected by the torque sensor 10, a vehicle speed Vh detected by a vehicle speed sensor 12, and the turning angle $\theta t$ calculated from the mechanical angle $\theta m$ of the motor 20, and controls current to be supplied to the motor 20 by a voltage control command value Vref obtained by subjecting the current command value to compensation or the like.

The controller 30 may include, for example, a computer including a processor and peripheral components such as a storage device. The processor may be, for example, a central processing unit (CPU) or a micro-processing unit (MPU).

The storage device may include any of a semiconductor storage device, a magnetic storage device, and an optical storage device. The storage device may include register, cache memory and memories, such as read only memory (ROM) and random access memory (RAM) used as primary storage devices.

Functions of the controller 30 described below are achieved by, for example, causing the processor of the controller 30 to execute a computer program stored in the storage device.

Note that the controller 30 may be formed by dedicated hardware for executing each information processing described below.

For example, the controller 30 may include a functional logic circuit that is set in a general-purpose semiconductor integrated circuit. For example, the controller 30 may include a programmable logic device (PLD) such as a field-programmable gate array (FPGA), or the like.

A function of the controller 30 to detect the turning angle $\theta t$ of a wheel turning mechanism is described below. As described above, the controller 30 calculates, as the turning angle $\theta t$, the rotation angle of the column output shaft 2o obtained by dividing the mechanical angle $\theta m$ of the rotation shaft of the motor 20 by the reduction ratio R of the reduction gear 3.

Here, the rotation shaft of the motor 20 is connected to the column output shaft 2o via the reduction gear 3. Therefore, the mechanical angle $\theta m$ of the motor 20 varies more than 360 degrees, which is an angle per rotation, during a time in which the wheel turning mechanism is turned from a neutral position to a rightward or leftward limit. Accordingly, the turning angle $\theta t$ of the wheel turning mechanism cannot be determined uniquely from the mechanical angle $\theta m$ of the motor 20.

Thus, the controller 30 calculates the turning angle $\theta t$ by holding turning angle information on the turning angle $\theta t$ and updating it as the mechanical angle $\theta m$ changes.

While the ignition key 11 is off, the controller 30 counts the number of rotations of the rotation shaft of the motor 20 instead of detecting the mechanical angle $\theta m$. For example, the controller 30 counts the number of rotations per ¼ rotation (i.e., for one quadrant unit) of the rotation shaft of the motor 20.

When the ignition key 11 is switched from off to on, a rotation angle $(360 \times n + \theta m)$ of the rotation shaft in an angular range over a plurality of rotations is calculated on the basis of a number n of rotations counted up to that point in time and the mechanical angle $\theta m$ detected at that time, and is divided by the reduction ratio R to obtain the turning angle $\theta t$.

However, for various reasons, the turning angle information may be lost. For example, removing the battery from a vehicle in order to avoid battery drain when transporting the vehicle over a long period of time results in loss of the turning angle information. When the turning angle information is lost, the turning angle $\theta t$ is unknown only from the mechanical angle $\theta m$ of the motor 20.

In such a case, detecting left and right rack end turning angles and calculating a median of the rack end turning angles allows for obtaining of a neutral position of the wheel turning mechanism.

However, the median of the left and right rack end turning angles does not necessarily coincide with a turning angle when the vehicle is traveling straight. Therefore, even when a turning angle at which the median of the rack end turning angles is the neutral position is calculated, it is not at a neutral position when the vehicle is traveling straight. In other words, it is not a turning angle with respect to the turning angle when the vehicle is traveling straight. Additionally, an error also occurs when detecting the rack end turning angles, so that the error reduces accuracy.

Thus, the controller 30 of the embodiment includes a turning angle detecting unit 31 that calculates a turning angle with respect to a turning angle when a vehicle is traveling straight.

The turning angle detecting unit 31 stores in advance a turning angle neutral point correction value $\Delta \theta t$, which is a difference between a median of left and right rack end turning angles and a turning angle when the vehicle is traveling straight. In addition, turning angle detecting unit 31 also stores in advance a motor initial position $\theta m0$, which is the mechanical angle $\theta m$ of the rotation shaft of the motor 20 detected by the rotation angle sensor 21 when the vehicle is traveling straight. The motor initial position $\theta m0$ is an example of an "actuator initial position" described in the claims.

The turning angle detecting unit 31 corrects a turning angle with respect to the median of the left and right rack end turning angles on the basis of the turning angle neutral point correction value $\Delta\theta t$ and the motor initial position $\theta m0$, thereby allowing for a highly accurate calculation of a turning angle with respect to the turning angle when the vehicle is traveling straight.

Figure 2:
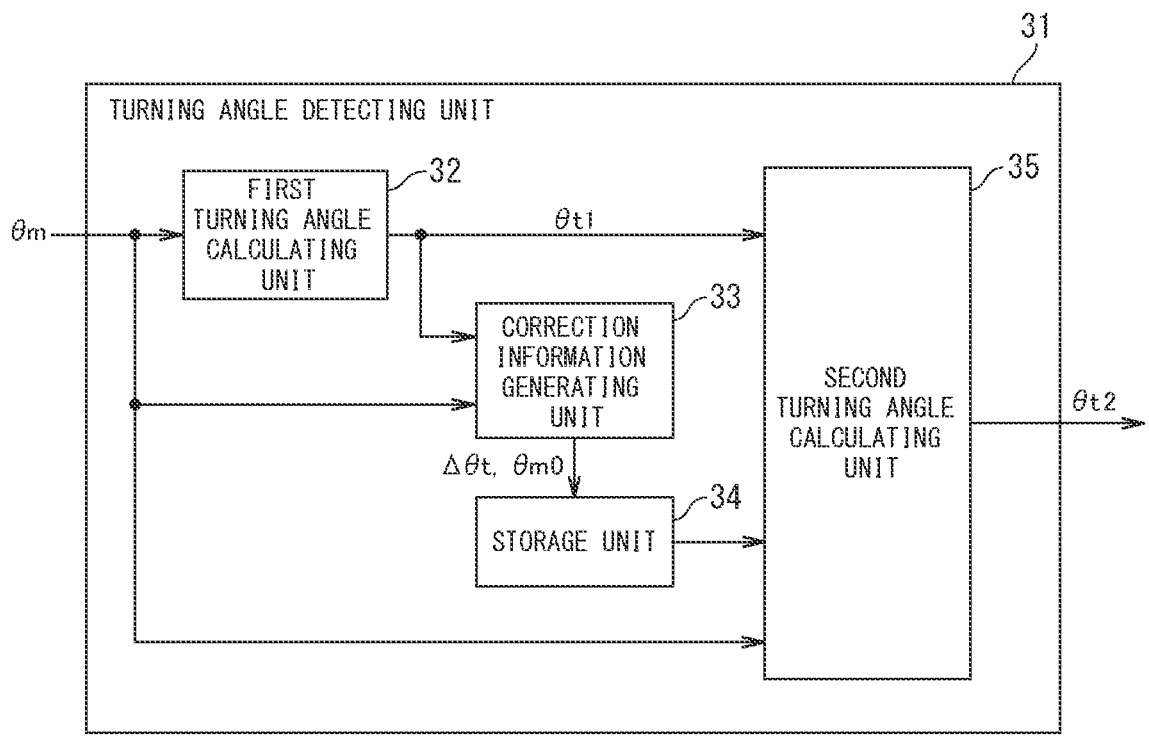
FIG. 2 is a block diagram illustrating an example of a functional configuration of a turning angle detecting unit illustrated in FIG. 1.

FIG. 2 is a block diagram of an example of a functional configuration of the turning angle detecting unit 31. The turning angle detecting unit 31 includes a first turning angle calculating unit 32, a correction information generating unit 33, a storage unit 34, and a second turning angle calculating unit 35.

The first turning angle calculating unit 32 calculates a turning angle $\theta t1$ of the wheel turning mechanism with respect to the median of the left and right rack end turning angles. In other words, the first turning angle calculating unit 32 calculates such a turning angle $\theta t1$ that the median of the left and right rack end turning angles is the neutral position. The turning angle $\theta t1$ is an example of a "first turning angle" described in the claims.

Hereinafter, the median of the left and right rack end turning angles may be described as "L2L midpoint position $\theta Ln$".

For example, the first turning angle calculating unit 32 detects respective left and right rack end turning angles using any given turning angle $\theta a$ (for example, a turning angle when power is turned on before storing turning angle information) as a reference angle.

The mechanical angle $\theta m$ of the rotation shaft of the motor 20 varies by 360 degrees or more during steering from one limit of right steering and left steering to the other limit thereof. Therefore, the first turning angle calculating unit 32 may count the number n of rotations of the rotation shaft and calculate each angle of the rotation shaft when the limits of the left and right steering are reached as a rotation angle $(360\times n+\theta m)$ in an angular range over a plurality of rotations. Each rotation angle is divided by the reduction ratio R to calculate left and right rack end turning angles.

The first turning angle calculating unit 32 obtains the median of the above rack end turning angles, sets it as the L2L midpoint position $\theta Ln$, and corrects a turning angle detected with respect to the any given turning angle $\theta a$ by the L2L midpoint position $\theta Ln$ (for example, by subtracting the L2L midpoint position $\theta Ln$) to calculate the turning angle $\theta t1$ with respect to the L2L midpoint position $\theta Ln$.

The correction information generating unit 33 generates, as the turning angle neutral point correction value $\Delta\theta t$, a difference between the L2L midpoint position $\theta Ln$ and the turning angle when the vehicle is traveling straight, and stores it in the storage unit 34. Additionally, the correction information generating unit 33 stores the mechanical angle $\theta m$ when the vehicle is traveling straight in the storage unit 34 as the motor initial position $\theta m0$. The storage unit 34 is an example of a "first storage unit", a "second storage unit", and a "third storage unit" described in the claims.

For example, at the time of factory shipment or the like, the correction information generating unit 33 may generate the turning angle neutral point correction value $\Delta\theta t$ and the motor initial position $\theta m0$ and store them in the storage unit 34.

For example, the correction information generating unit 33 stores, as the turning angle neutral point correction value $\Delta\theta t$, a sign-reversed value $(-\theta t1)$ of the output $\theta t1$ of the first turning angle calculating unit 32 when the vehicle is traveling straight in the storage unit 34.

The second turning angle calculating unit 35 corrects the turning angle $\theta t1$ on the basis of the mechanical angle $\theta m$, the turning angle neutral point correction value $\Delta\theta t$, and the motor initial position $\theta m0$ to calculate a corrected turning angle $\theta t2$ with respect to the turning angle of the wheel turning mechanism when the vehicle is traveling straight. The corrected turning angle $\theta t2$ is an example of a "second turning angle" described in the claims.

The second turning angle calculating unit 35 calculates a turning angle $\theta nt$ with respect to a point where the L2L midpoint position $\theta Ln$ has been corrected by the turning angle neutral point correction value $\Delta\theta t$. Hereinafter, the turning angle $\theta nt$ with respect to the point where the L2L midpoint position $\theta Ln$ has been corrected by the turning angle neutral point correction value $\Delta\theta t$ is described as "L2L midpoint turning angle $\theta nt$". For example, the second turning angle calculating unit 35 may calculate the L2L midpoint turning angle $\theta nt=\theta t1-\Delta\theta t$ by subtracting the turning angle neutral point correction value $\Delta\theta t$ from the turning angle $\theta t1$. The L2L midpoint turning angle $\theta nt$ is an example of a "third turning angle" described in the claims.

The second turning angle calculating unit 35 converts the L2L midpoint turning angle $\theta nt$ to a mechanical angle $\theta nm$. Hereinafter, the mechanical angle $\theta nm$ is described as "L2L mechanical angle $\theta nm$".

Specifically, the second turning angle calculating unit 35 multiplies the L2L midpoint turning angle $\theta nt$ by the reduction ratio R to covert the L2L midpoint turning angle $\theta nt$ to a mechanical angle scale. Hereinafter, the L2L midpoint turning angle $(\theta nt\times R)$ converted to the mechanical angle scale is described as "converted L2L midpoint turning angle $\theta ntc$".

The second turning angle calculating unit 35 calculates, as the L2L mechanical angle $\theta nm$, a remainder $\text{mod}(\theta ntc, 360)$ of the converted L2L midpoint turning angle $\theta ntc$ divided by 360 degrees, which is an amount of angular change per rotation. The L2L mechanical angle $\theta nm$ is an example of a "third actuator position" described in the claims.

Additionally, the second turning angle calculating unit 35 corrects the mechanical angle $\theta m$ detected by the rotation angle sensor 21 by the motor initial position $\theta m0$ to calculate a mechanical angle $\theta m2=\theta m-\theta m0$ with respect to the motor initial position $\theta m0$. Hereinafter, the mechanical angle $\theta m2$ is described as "second motor mechanical angle $\theta m2$".

Figure 3A:
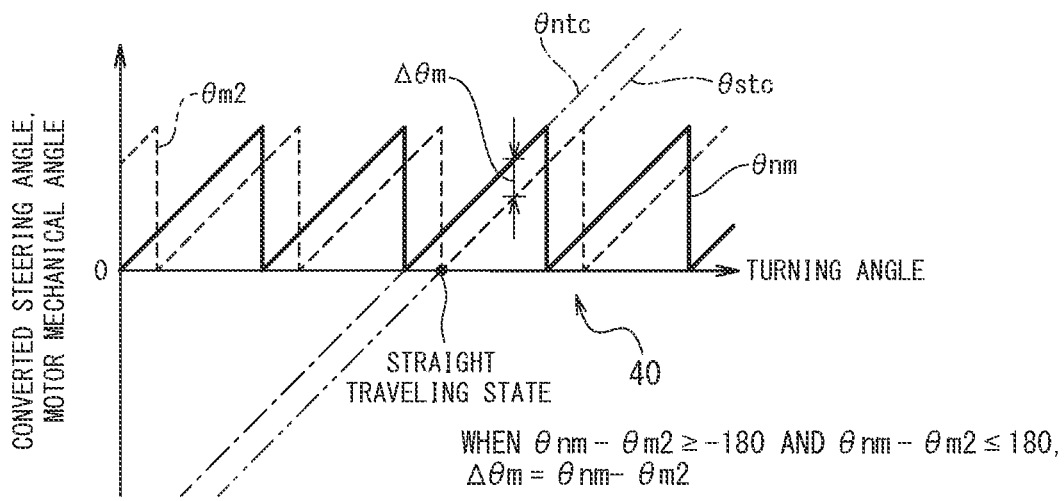
FIGS. 3A to 3C are illustrative diagrams of an example of a turning angle detection method of an embodiment.
Figure 3B:
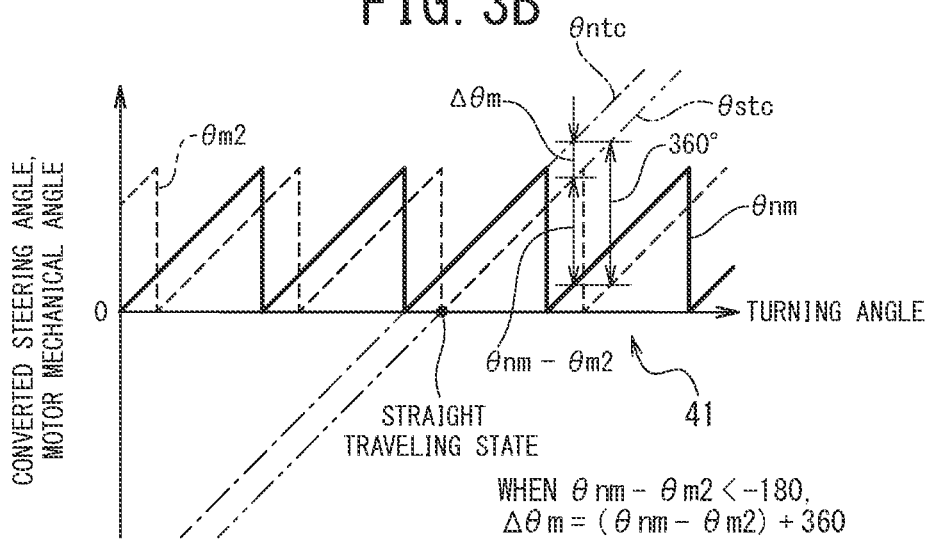
Figure 3C:
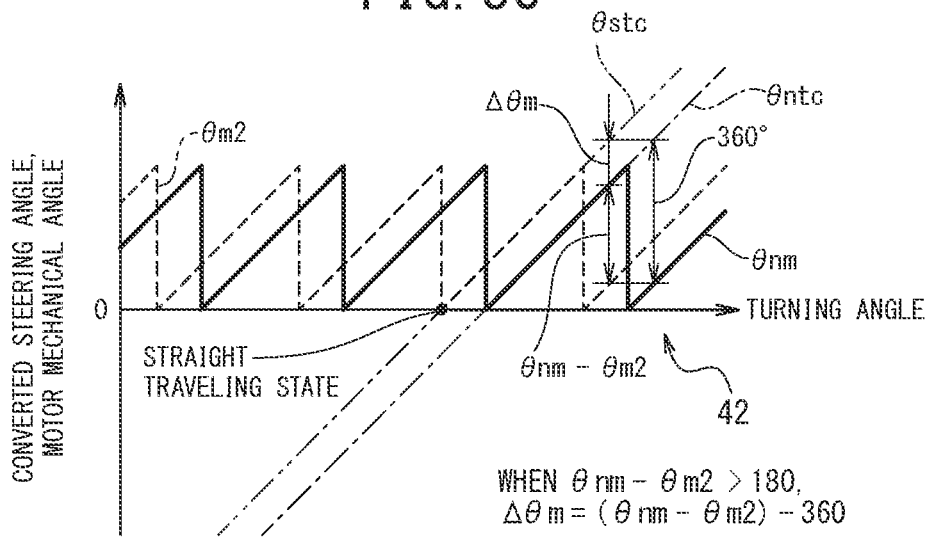

In FIGS. 3A to 3C, dash-dot-dash lines indicate the converted L2L midpoint turning angle $\theta ntc$, solid lines indicate the L2L mechanical angle $\theta nm$, and dashed lines indicate the second motor mechanical angle $\theta m2$.

On the basis of a value of a difference $(\theta nm-\theta m2)$ between the L2L mechanical angle $\theta nm$ and the second motor mechanical angle $\theta m2$, the second turning angle calculating unit 35 calculates a motor position difference $\Delta\theta m$ as below. The motor position difference $\Delta\theta m$ is an example of an "actuator position difference" described in the claims.

(1) When the difference $(\theta nm-\theta m2)\geq(-180)$ degrees and the difference $(\theta nm-\theta m2)\geq(180)$ degrees, the difference ($\theta nm-\theta m2$) is set as the motor position difference $\Delta\theta m$ as it is, as illustrated in an arrow view 40 in FIG. 3A.

(2) When the difference ($\theta nm-\theta m2$)≤(−180) degrees, a sum of the difference ($\theta nm-\theta m2$) plus 360 degrees is set as the motor position difference $\Delta\theta m$, as illustrated in an arrow view 41 in FIG. 3B.

(3) When the difference ($\theta nm-\theta m2$)>180 degrees, a difference of the difference ($\theta nm-\theta m2$) minus 360 degrees is set as the motor position difference $\Delta\theta m$, as illustrated in an arrow view 42 in FIG. 3C.

In FIGS. 3A to 3C, dash-dot-dot-dash lines indicate an angle $\theta stc$ obtained by multiplying a turning angle with respect to the turning angle when the vehicle is traveling straight by the reduction ratio R to convert the product to a mechanical angle scale. Hereinafter, the angle $\theta stc$ is described as "converted straight travel midpoint turning angle $\theta stc$".

As can be seen from FIGS. 3A to 3C, by subtracting the motor position difference $\Delta\theta m$ from the converted L2L midpoint turning angle $\theta ntc$, the converted L2L midpoint turning angle $\theta ntc$ can be corrected to the converted straight travel midpoint turning angle $\theta stc$. Dividing the converted straight travel midpoint turning angle $\theta stc$ by the reduction ratio R allows for calculation of the turning angle with respect to the turning angle when the vehicle is traveling straight.

Here, L2L midpoint turning angle $\theta nt$=(converted L2L midpoint turning angle $\theta ntc$/reduction ratio R). Therefore, the second turning angle calculating unit 35 calculates, as the corrected turning angle $\theta t2$, a difference ($\theta nt-\Delta\theta m/R$) obtained by subtracting a result ($\Delta\theta m/R$) of the motor position difference $\Delta\theta m$ divided by the reduction ratio R from the L2L midpoint turning angle $\theta nt$.

This allows the second turning angle calculating unit 35 to calculate the corrected turning angle $\theta t2$ as the turning angle with respect to the turning angle when the vehicle is traveling straight when the following (condition 1) and (condition 2) are satisfied.

(Condition 1): there is no change due to parts replacement or the like in a mechanical unit mounted with the motor 20 from the time of storage of the turning angle neutral point correction value $\Delta\theta t$ and the motor initial position $\theta m0$ (for example, the time of factory shipment) to the time of calculation of the corrected turning angle $\theta t2$.

(Condition 2): An error between the L2L midpoint position $\theta Ln$ used when storing the turning angle neutral point correction value $\Delta\theta t$ and the L2L midpoint position $\theta Ln$ used when calculating the corrected turning angle $\theta t2$ is less than a mechanical angle of 180 degrees.

(Operation)

Figure 4A:
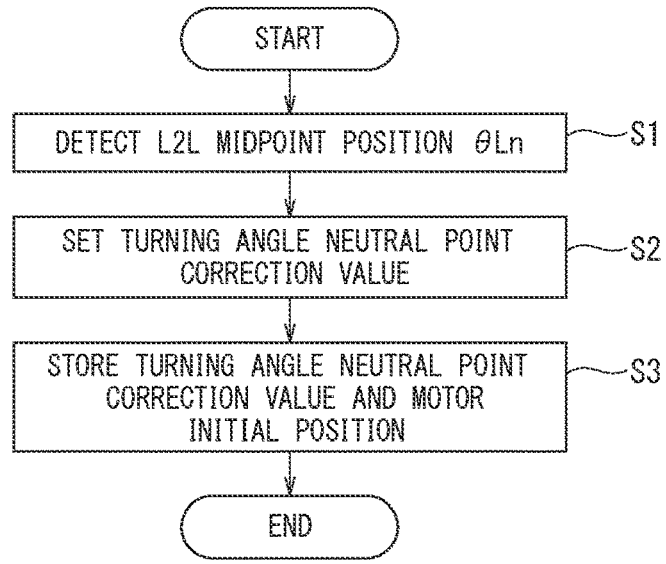
FIG. 4A is a flowchart of an example of an initial setting process.

Next, an example of a method for detecting a turning angle of an embodiment is described with reference to FIGS. 4A and 4B. FIG. 4A is a flowchart of an example of an initial setting process for generating the turning angle neutral point correction value $\Delta\theta t$ and the motor initial position $\theta m0$ and storing them in the storage unit 34.

At step S1, the first turning angle calculating unit 32 detects respective left and right rack end turning angles and detects a median thereof as the L2L midpoint position $\theta Ln$.

At step S2, the correction information generating unit 33 generates a difference between the L2L midpoint position $\theta Ln$ and the turning angle when the vehicle is traveling straight as the turning angle neutral point correction value $\Delta\theta t$, and stores the difference in the storage unit 34.

At step S3, the correction information generating unit 33 stores the mechanical angle $\theta m$ when the vehicle is traveling straight in the storage unit 34 as the motor initial position $\theta m0$.

Then, the initial setting process is ended.

Figure 4B:
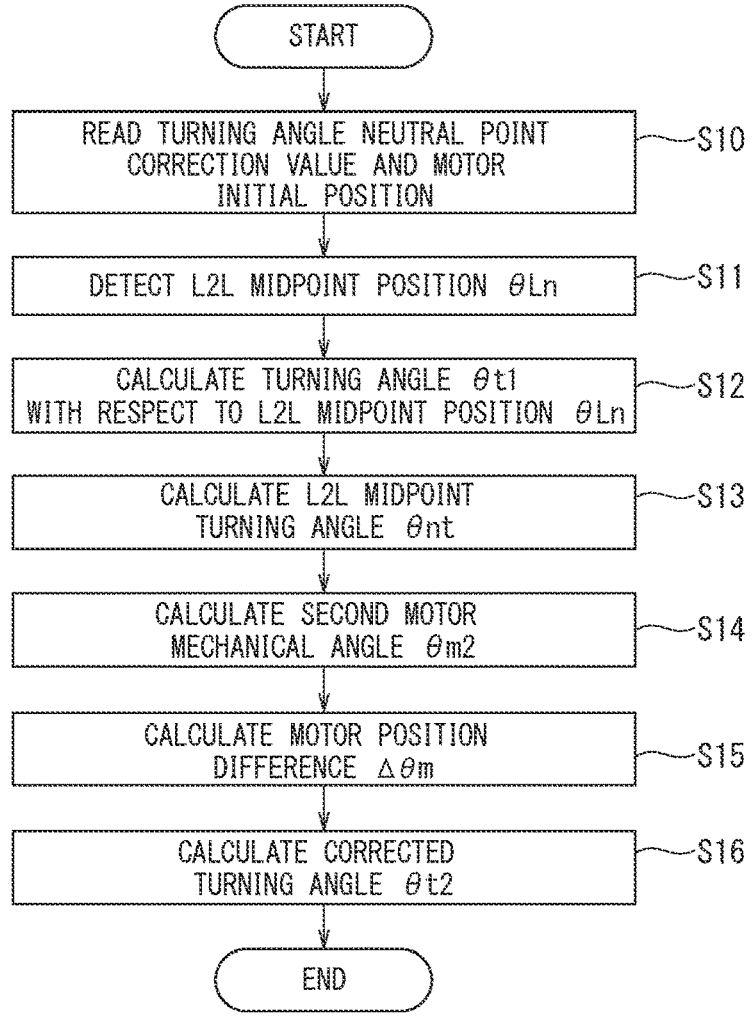
FIG. 4B is a flowchart of an example of a turning angle information restoration process.

FIG. 4B is a flowchart of an example of a turning angle information restoration process for calculating the corrected turning angle $\theta t2$. This process is performed when the battery is reconnected.

At step S10, the second turning angle calculating unit 35 reads the turning angle neutral point correction value $\Delta\theta t$ and the motor initial position $\theta m0$ from the storage unit 34.

At step S11, the first turning angle calculating unit 32 detects respective left and right rack end turning angles and detects a median thereof as the L2L midpoint position $\theta Ln$.

At step S12, the first turning angle calculating unit 32 calculates the turning angle $\theta t1$ with respect to the L2L midpoint position $\theta Ln$.

At step S13, the second turning angle calculating unit 35 subtracts the turning angle neutral point correction value $\Delta\theta t$ from the turning angle $\theta t1$ to calculate the L2L midpoint turning angle $\theta nt$.

At step S14, the second turning angle calculating unit 35 corrects the mechanical angle $\theta m$ detected by the rotation angle sensor 21 by the motor initial position $\theta m0$ to calculate the second motor mechanical angle $\theta m2$ with respect to the motor initial position $\theta m0$.

At step S15, the second turning angle calculating unit 35 converts the L2L midpoint turning angle $\theta nt$ to the motor mechanical angle. Then, the second turning angle calculating unit 35 calculates the motor position difference $\Delta\theta m$ on the basis of a value of the difference ($\theta nm-\theta m2$) between the L2L mechanical angle $\theta nm$ and the second motor mechanical angle $\theta m2$.

At step S16, the second turning angle calculating unit 35 subtracts the result ($\Delta\theta m/R$) of the motor position difference $\Delta\theta m$ divided by the reduction ratio R from the L2L midpoint turning angle $\theta nt$ to calculate the corrected turning angle $\theta t2$.

Then, the turning angle information restoration process is ended.

Effects of Embodiment (1) The rotation angle sensor 21 and the first turning angle calculating unit 32 detect a turning angle of the wheel turning mechanism. The correction information generating unit 33 stores, in the storage unit 34, the turning angle neutral point correction value $\Delta\theta t$, which is the difference between the median of the turning angles at respective limits in right steering and left steering and the turning angle when the vehicle is traveling straight, and the motor initial position $\theta m0$, which is the angle of the rotation shaft of the motor 20 when the vehicle is traveling straight. The rotation sensor 21 detects the mechanical angle $\theta m$ of the rotation shaft of the motor 20. On the basis of the mechanical angle $\theta m$, the first turning angle calculating unit 32 calculates the turning angle $\theta t1$ of the wheel turning mechanism with respect to the median of the turning angles at the respective limits in the right steering and the left steering. The second turning angle calculating unit 35 calculates the corrected turning angle $\theta t2$ with respect to the turning angle of the wheel turning mechanism when the vehicle is traveling straight on the basis of the mechanical angle $\theta m$, the turning angle neutral point correction value $\Delta\theta t$, the motor initial position $\theta m0$, and the turning angle $\theta t1$.

As a result, even when turning angle information is lost, a calculation can be made for the corrected turning angle $θt2$ with respect to the turning angle of the wheel turning mechanism when the vehicle is traveling straight.

Additionally, even when an error occurs in the detection of the rack end turning angles, the corrected turning angle $θt2$ can be calculated with high accuracy without including such an error.

(2) The second turning angle calculating unit 35 may calculate the second motor mechanical angle $θm2$, which is the mechanical angle of the rotation shaft of the motor 20 with respect to the motor initial position $θm0$, on the basis of the mechanical angle $θm$ and the motor initial position $θm0$, and may calculate the corrected turning angle $θt2$ on the basis of the L2L midpoint turning angle $θnt$ obtained by correcting the turning angle $θt1$ by the turning angle neutral point correction value $Δθt$ and the second motor mechanical angle $θm2$.

By correcting the turning angle $θt1$ by the turning angle neutral point correction value $Δθt$ before correcting on the basis of the second motor mechanical angle $θm2$, correction can be made on the basis of the second motor mechanical angle $θm2$ even when the turning angle $θt1$ is 180 degrees or more away from the turning angle with respect to the turning angle of the wheel turning mechanism when the vehicle is traveling straight.

(3) The second turning angle calculating unit 35 may calculate the corrected turning angle $θt2$ by calculating the motor position difference $Δθm$, which is the difference between the L2L mechanical angle $θnm$ corresponding to the L2L midpoint turning angle $θnt$ and the second motor mechanical angle $θm2$, and correcting the L2L midpoint turning angle $θnt$ on the basis of the value $(Δθm/R)$ obtained by dividing the motor position difference $Δθm$ by the reduction ratio R.

This allows for calculation of the corrected turning angle $θt2$ on the basis of the L2L midpoint turning angle $θnt$ and the second motor mechanical angle $θm2$.

(4) The second turning angle calculating unit may calculate, as the L2L mechanical angle $θnm$, the remainder mod $(θnt×R, 360)$ of the product $(θnt×R)$ of the L2L midpoint turning angle $θnt$ and the reduction ratio R divided by 360 degrees.

This allows for calculation of the L2L mechanical angle $θnm$ for use in the calculation of the motor position difference $Δθm$.

Modification 1

The above embodiment is an example of the method for calculating the corrected turning angle $θt2$. The corrected turning angle $θt2$ can be calculated by various methods on the basis of the mechanical angle $θm$, the turning angle neutral point correction value $Δθt$, the motor initial position $θm0$, and the first turning angle $θt1$. The following is a description of several modifications.

The second turning angle calculating unit 35 may calculate a difference $(θntc−θm2)$ of the second motor mechanical angle $θm2$ subtracted from the corrected L2L midpoint turning angle $θntc$, which is the product of the L2L midpoint turning angle $θnt$ and the reduction ratio R, and may calculate the motor position difference $Δθm$ on the basis of a remainder $mod(θntc−θm2, 360)$ of the difference $(θntc−θm2)$ divided by 360 degrees.

Figure 5A:
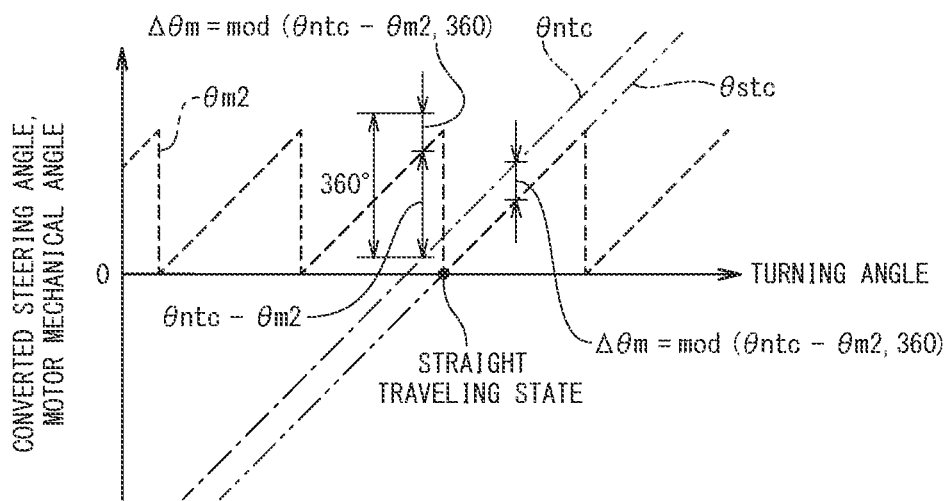
FIGS. 5A and 5B are illustrative diagrams of an example of turning angle detection methods of modifications.

Then, as in FIG. 5A, when $mod(θntc−θm2, 360)$ 180 degrees, the $mod(θntc−θm2, 360)$ is set as the motor position difference $Δθm$.

Figure 5B:
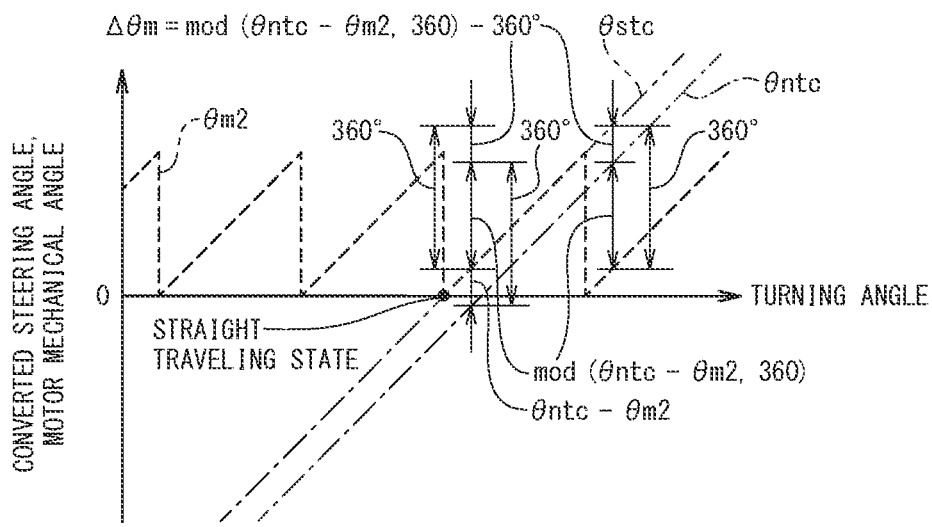

On the other hand, as in FIG. 5B, when $mod(θntc−θm2, 360)>180$ degrees, the $mod(θntc−θm2, 360)−360$ degrees is set as the motor position difference $Δθm$.

Even setting the motor position difference $Δθm$ in this way allows for calculation of the corrected turning angle $θt2$.

Modification 2

The correction information generating unit 33 may calculate a difference $(Δθt×R−θm0)$ of the motor initial position $θm0$ subtracted from the product $(Δθt×R)$ of the turning angle neutral point correction value $Δθt$ and the reduction ratio R, and may store it as a correction amount difference $(Δθt×R−θm0)$.

The second turning angle calculating unit 35 may calculate a value $(θt1× R−(Δθt×R−θm0)−θm)$ of the correction amount difference $(Δθt×R−)θm0$ and the mechanical angle $θm$ subtracted from a product of the first turning angle $θt1$ and the reduction ratio R.

The value $(θt1× R−(Δθt×R−θm0)−θm)$ calculated in this way can be summarized into $(θt1−Δθt)×R−(θm−θm0)=(θntc−θm2)$, which is equal to the difference $(θntc−θm2)$ in Modification 1.

Even calculating the difference $(θntc−θm2)$ in this way allows for calculation of the corrected turning angle $θt2$.

Modification 3

A correction amount for correcting the L2L midpoint turning angle $θnt$ may be determined on the basis of a difference $(θnt−θm2/R)$ obtained by subtracting a value $θm2/R$ of the second motor mechanical angle $θm2$ divided by the reduction ratio R to be converted to the scale of a rotation angle of the column shaft 2o from the L2L midpoint turning angle $θnt$.

For example, the difference $(θnt−θm2/R)$ may be varied by varying the mechanical angle $θm$ by steering the steering wheel, the difference $(θnt−θm2/R)$ with the smallest absolute value may be set as the correction amount, and the L2L midpoint turning angle $θnt$ may be corrected by the correction amount set in this way to calculate the corrected turning angle $θt2$.

This method also allows for calculation of the corrected turning angle $θt2$.

Modification 4

The turning angle $θt$ may be calculated on the basis of a rotation angle detected by a turning angle sensor mounted on the column input shaft 2i side or the column output shaft 2o side.

REFERENCE SIGNS LIST

1: Steering wheel
2*i*: Column input shaft
2*o*: Column output shaft
3: Reduction gear
4: Intermediate shaft
4*a*, 4*b*: Universal joint
4*c*: Shaft member
5: Pinion rack mechanism
5*a*: Pinion
5*b*: Rack
6*a*, 6*b*: Tie rod
7*a*, 7*b*: Hub unit
8L, 8R: Steered wheel
10: Torque sensor
11: Ignition key
12: Vehicle speed sensor
13: Battery
20: Motor
21: Rotation angle sensor 30: Controller
31: Turning angle detecting unit
32: First turning angle calculating unit
33: Correction information generating unit
34: Storage unit
35: Second turning angle calculating unit

The invention claimed is:

1. A turning angle detecting device comprising:
a position detecting unit configured to detect a turning angle of a wheel turning mechanism;
an actuator configured to drive the wheel turning mechanism;
a first storage unit configured to store a turning angle neutral point correction value being a difference between a median of the turning angles at respective limits in a right steering and a left steering and the turning angle when a vehicle is traveling straight;
a second storage unit configured to store an actuator initial position being a position of a movable portion of the actuator when the vehicle is traveling straight;
an actuator position detecting unit configured to detect the position of the movable portion of the actuator as a first actuator position;
a first turning angle calculating unit configured to calculate, as a first turning angle, the turning angle of the wheel turning mechanism with respect to the median of the turning angles at the respective limits in the right steering and the left steering on a basis of the first actuator position; and
a second turning angle calculating unit configured to calculate a second turning angle with respect to the turning angle of the wheel turning mechanism when the vehicle is traveling straight on a basis of the first actuator position, the turning angle neutral point correction value, the actuator initial position, and the first turning angle.

2. The turning angle detecting device according to claim 1, wherein the second turning angle calculating unit calculates a second actuator position being a position of the actuator with respect to the actuator initial position on a basis of the first actuator position and the actuator initial position, and calculates the second turning angle on a basis of a third turning angle obtained by correcting the first turning angle by the turning angle neutral point correction value and the second actuator position.

3. The turning angle detecting device according to claim 2, wherein the second turning angle calculating unit calculates an actuator position difference being a difference between a third actuator position corresponding to the third turning angle and the second actuator position, and corrects the third turning angle on a basis of a product of a ratio of an amount of change in the turning angle of the wheel turning mechanism to an amount of change in the position of the movable portion of the actuator and the actuator position difference to calculate the second turning angle.

4. The turning angle detecting device according to claim 3, wherein the second turning angle calculating unit calculates the third actuator position by obtaining a remainder of a product of a conversion coefficient being a reciprocal of a ratio of the amount of change in the turning angle of the wheel turning mechanism to an amount of rotation of a rotation shaft of a motor being the actuator and the third turning angle divided by 360 degrees.

5. The turning angle detecting device according to claim 2, wherein the second turning angle calculating unit calculates, as an actuator position difference, a remainder when a difference of the second actuator position subtracted from a product of a conversion coefficient being a reciprocal of a ratio of an amount of change in the turning angle of the wheel turning mechanism to an amount of rotation of a rotation shaft of a motor being the actuator and the third turning angle is divided by 360 degrees, and corrects the third turning angle on a basis of a value of the actuator position difference divided by the conversion coefficient to calculate the second turning angle.

6. The turning angle detecting device according to claim 2, comprising a third storage unit configured to store a correction amount difference being a difference between a product of a conversion coefficient being a reciprocal of a ratio of an amount of change in the turning angle of the wheel turning mechanism to an amount of rotation of a rotation shaft of a motor being the actuator and the turning angle neutral point correction value and the actuator initial position,
wherein the second turning angle calculating unit calculates, as an actuator position difference, a remainder obtained by dividing a difference of the correction amount difference and the first actuator position subtracted from a product of the first turning angle and the conversion coefficient by 360 degrees, and corrects the third turning angle on a basis of a value of the actuator position difference divided by the conversion coefficient to calculate the second turning angle.

7. The turning angle detecting device according to claim 2, wherein the second turning angle calculating unit corrects the third turning angle on a basis of a difference of a product of a ratio of an amount of change in the turning angle of the wheel turning mechanism to an amount of change in the position of the movable portion of the actuator and the second actuator position subtracted from the third turning angle to calculate the second turning angle.

8. An electric power steering device comprising the turning angle detecting device according to claim 1,
wherein the actuator is driven on a basis of the second turning angle to apply a turning assist force to the wheel turning mechanism.

* * * * *